E. H. SEARS.
TOOL-HANDLE.
No. 192,086. Patented June 19, 1877.
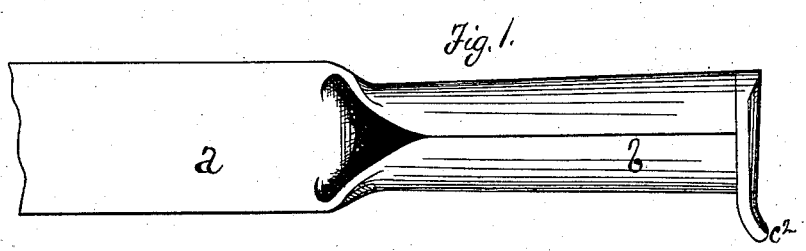
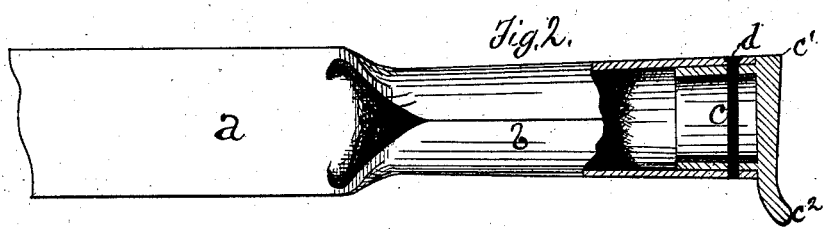
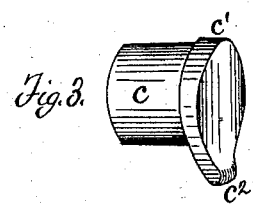
WITNESSES:
Robt. F. Gaylord
Geo. G. Sill
INVENTOR:
E. H. Sears
By W. E. Simonds
Att'y

UNITED STATES PATENT OFFICE.

EDWARD H. SEARS, OF COLLINSVILLE, CONNECTICUT, ASSIGNOR TO THE COLLINS COMPANY, OF SAME PLACE.

IMPROVEMENT IN TOOL-HANDLES.

Specification forming part of Letters Patent No. 192,086, dated June 19, 1877; application filed February 12, 1877.

*To all whom it may concern:*

Be it known that I, EDWARD H. SEARS, of Collinsville, in the county of Hartford and State of Connecticut, have invented an Improvement in Tool-Handles, of which the following is a specification, reference being had to the accompanying drawings, where—

Figure 1 is a side view. Fig. 2 is a similar view with a part in section. Fig. 3 is a view of the end piece.

The drawings and description show and describe my improved handle as applied to a machete or knife. The handle is applicable to tools generally.

The blade $a$ and handle $b$ are both of one piece of metal, the handle being formed by bending the metal into cylindrical shape till the edges meet. The end piece has a cylindrical part, $c$, fitting to the inside of the round handle, a shoulder, $c^1$, fitting to the top or end of the handle, and a tang, $c^2$, which prevents the holder's hand from slipping endwise off the handle when using the implement. The end piece is secured in the handle in any suitable manner, as by dovetailing, brazing. I prefer the use of the rivet $d$.

This end piece has, among others, uses as follows: First, it affords a guard to prevent the holder's hand from slipping; second, it strengthens the cylindrical handle so that it cannot be battered or bent inward; third, it gives solidity, symmetry, finish, and strength to the handle.

I claim as my invention—

The end piece $c$, provided with the tang $c^2$, in combination with the hollow handle $b$, provided with blade $a$, in the manner and for the purpose specified.

EDWARD H. SEARS.

Witnesses:
ROBT. F. GAYLORD,
WM. E. SIMONDS.